United States Patent
Moriwaki

(10) Patent No.: US 6,738,161 B1
(45) Date of Patent: May 18, 2004

(54) APPARATUS AND METHOD FOR PROCESSING CONTRAST CORRECTION OF IMAGE

(75) Inventor: Kagumi Moriwaki, Itami (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/537,098

(22) Filed: Mar. 29, 2000

(30) Foreign Application Priority Data

Mar. 29, 1999 (JP) .......................................... 11-086060

(51) Int. Cl.⁷ ................................................ G06K 9/00
(52) U.S. Cl. ...................... 358/1.9; 382/168; 382/171; 382/274
(58) Field of Search .................. 358/1.9, 522; 382/168, 382/169, 170, 171, 172, 254, 273, 274

(56) References Cited

U.S. PATENT DOCUMENTS

| | | | | | |
|---|---|---|---|---|---|
| 5,179,599 | A | * | 1/1993 | Formanek | 382/172 |
| 5,280,367 | A | * | 1/1994 | Zuniga | 358/462 |
| 5,581,370 | A | * | 12/1996 | Fuss et al. | 358/447 |
| 5,680,477 | A | * | 10/1997 | Asada | 382/169 |
| 5,748,802 | A | * | 5/1998 | Winkelman | 382/271 |
| 5,805,723 | A | * | 9/1998 | Fujiwara | 382/172 |
| 5,878,163 | A | * | 3/1999 | Stephan et al. | 382/172 |
| 6,014,469 | A | * | 1/2000 | Eschbach | 382/261 |
| 6,175,427 | B1 | * | 1/2001 | Lehmbeck et al. | 358/1.9 |
| 6,445,818 | B1 | * | 9/2002 | Klim et al. | 382/165 |

FOREIGN PATENT DOCUMENTS

| | | |
|---|---|---|
| JP | 8-84247 | 3/1996 |
| JP | 9-247483 | 9/1997 |

\* cited by examiner

*Primary Examiner*—Thomas D. Lee
(74) *Attorney, Agent, or Firm*—Burns, Doane, Swecker & Mathis, L.L.P.

(57) ABSTRACT

In one aspect of the invention, in image processing on contrast, an image is divided into rectangles, and a histogram of value data of the image is generated for each of the rectangles. It is discriminated whether the histogram generated by said histogram generator has a plurality of peaks. Then, contrast is enhanced in the unit of rectangle according to histogram. When the histogram of the rectangle is discriminated to have a plurality of peaks, a rectangle is divided into sub-areas and contrast is enhanced in the rectangle in the unit of sub-area. Alternatively, the contrast enhanced above is suppressed in the unit of rectangle on a rectangle on which the histogram thereof is discriminated to have a plurality of peaks.

33 Claims, 8 Drawing Sheets

APPARATUS AND METHOD FOR PROCESSING CONTRAST CORRECTION OF IMAGE

This application is based on application Ser. No. 11-86060 filed in Japan, the contents of which are hereby incorporated by reference.

BACKGROUND OF THE INVENTION

1. Field of the Invention

The present invention relates to image processing on contrast of an image.

2. Description of Prior Art

Various kinds of image correction have been proposed on digital image data. As a contrast correction technique for an image, it is known to divide an image into rectangles and to emphasize image for each rectangle so as to optimize contrast for each rectangle of the image at a high speed.

In an example of the above-mentioned contrast correction in the unit of rectangle, an image is divided first into rectangles, and a factor of contrast enhancement is determined for each of the rectangles. The contrast enhancement factor is determined based on the pattern of histogram of image data. Image data comprises components of value, chroma and hue. For example, the contrast enhancement factor is calculated so as to expand the value histogram over the entire dynamic range. The factor is calculated for all the rectangles. Then, each pixel data in the image is converted by using the contrast enhancement factor of the rectangle including the pixel under conversion. In order to keep continuity of image data between adjacent rectangles, for example, the pixel data is converted with linear extrapolation by using contrast enhancement factors of adjacent rectangles.

However, a rectangle may include two or more sub-areas having large difference of value data between them. In such a case, in the above-mentioned contrast correction, the contrast correction may over-emphasize contrast unnecessarily, or value data may be reversed between adjacent rectangles in contrast to actual value distribution between them. Then, it is desirable to prevent such partial over-emphasis or reversal.

SUMMARY OF THE INVENTION

An object of the present invention is to provide an apparatus and a method for image correction with optimum contrast.

In one aspect of the invention, in image processing on contrast, an image is divided into rectangles, and a histogram of value data of the image is generated for each of the rectangles. It is discriminated whether the histogram generated by said histogram generator has a plurality of peaks. Then, contrast is enhanced in the unit of rectangle according to histogram. Further, when the histogram of the rectangle is discriminated to have a plurality of peaks, a rectangle is divided into sub-areas and contrast is enhanced in the rectangle in the unit of sub-area.

In another aspect of the invention, in image processing on contrast, an image is divided into rectangles, and a histogram of value data of the image is generated for each of the rectangles. It is discriminated whether the histogram generated by said histogram generator has a plurality of peaks. Then, contrast is enhanced in the unit of rectangle according to histogram. Further, when the histogram of a rectangle is discriminated to have a plurality of peaks, the contrast on the rectangle is enhanced to a degree smaller than the counterpart when the histogram of a rectangle is not discriminated to have a plurality of peaks.

An advantage of the invention is that when contrast correction is performed in an image at fast speed, partial over-emphasis of contrast and partial reversal of image data are prevented.

Another advantage of the invention is that without dividing the rectangles, partial over-emphasis of contrast and partial reversal of image data are prevented at fast speed in a simple way.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
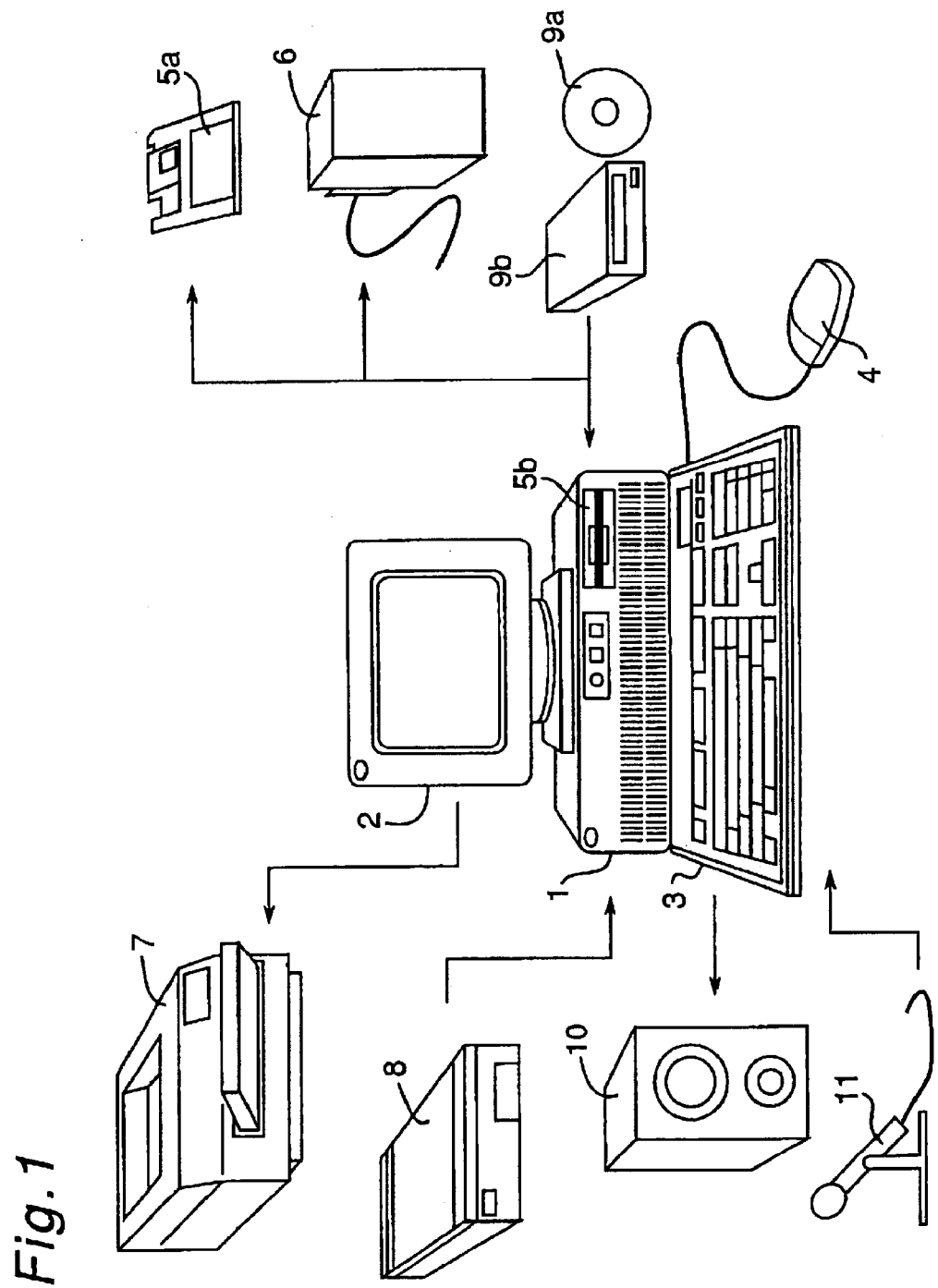
FIG. 1 is a diagram of an image processor.

Referring now to the drawings, wherein like reference characters designate like or corresponding parts throughout the several views, FIG. 1 shows an image processor (hereinafter referred to as system) of an embodiment of the invention. The system is a database system on image data. The system has a controller (computer) 1 to control the entire system. A display device 2 displays images or characters, various screens for instructions, and the like. A keyboard 3 and a mouse 4 are provided for inputting various data and instructions. A flexible disk drive 5b writes and reads data to and from a flexible disk 5a. A hard disk drive 6 stores image data and its attribute information. A printer 7 prints an image on a paper based on image data. A scanner 8 reads image data from documents. A CD-ROM drive 9b reads image data from a compact disk (CD-ROM) 9a storing a number of image data in a predetermined format. Image data read by the scanner 8 or the CD-ROM drive 9b are written to the hard disk drive 6. The above-mentioned devices are connected through cables to the controller 1. The arrows shown in FIG. 1 mean directions of data communication in the system. The devices may be integrated with the controller 1 as one body.

Figure 2:
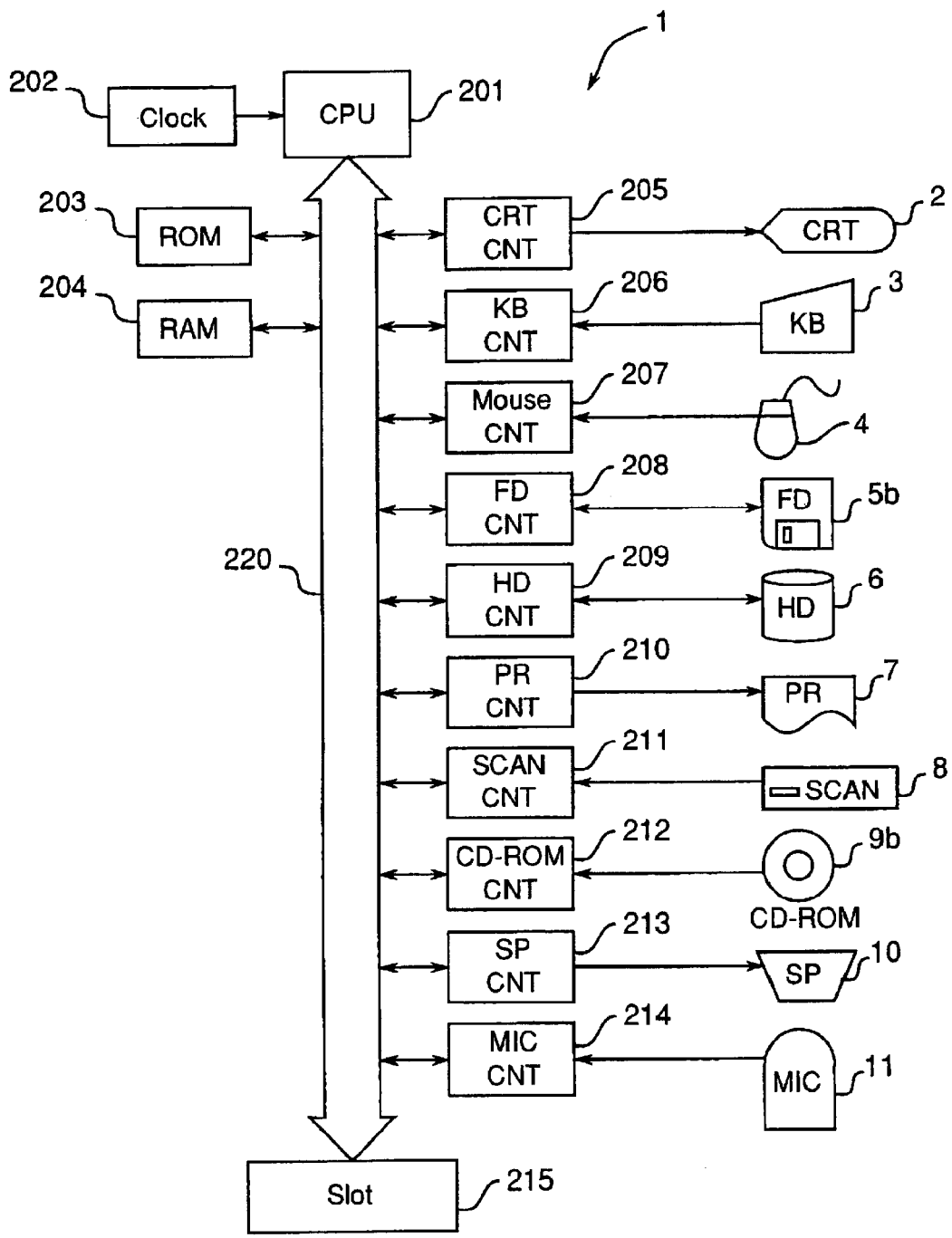
FIG. 2 is a block diagram on a controller in the image processor.

FIG. 2 shows a block diagram on the controller 1. The controller 1 includes a central processing unit (CPU) 201, which is connected through a data bus 220 to a read-only memory (ROM) 203, a random access memory (RAM) 204 for storing various data, a display controller 205 for displaying images, characters and the like in the display device 2, a keyboard controller 206 for transmitting input signals from the keyboard 3, a mouse controller 207 which controls input signals from the mouse 4, a controller 208 which controls the flexible disk drive 5b, a controller 209 which controls the hard disk drive 6, a print controller 210 which controls output data to the printer 7, a scanner controller 211 which receives data from the scanner 8, and a controller 212 which controls the CD-ROM drive 9b. The CPU 201 is also connected to a clock generator 202 which generates clock signals used for the operation of the system. It is further connected to an enhancement slot 215 for connecting various extension boards through the data bus 220. The extension slot 215 may be connected to a small computer system interface (SCSI) board which may be connected to a flexible disk drive, a hard disk drive, a scanner a CD-ROM drive or the like. Though the scanner 8 and the CD-ROM drive 9b are used for inputting image data, a digital camera or the like may also be used. The above-mentioned hardware circuit may be installed in an image input device such as a digital camera.

In the automatic image correction in the system, image data are subjected to image correction including correction on contrast and value. When a user instructs to start image correction, an image correction routine is invoked for the automatic image correction. The routine further includes image file input/output processing, image display processing, a graphic user interface (GUI) processing for instructions for contrast correction and the like, error processing in the graphic user interface, and resolution change processing, but the explanation thereon is omitted. The software programs used for the system are supplied with a storage medium such as a flexible disk or a CD-ROM, and they are installed therewith in the system.

Figure 3:
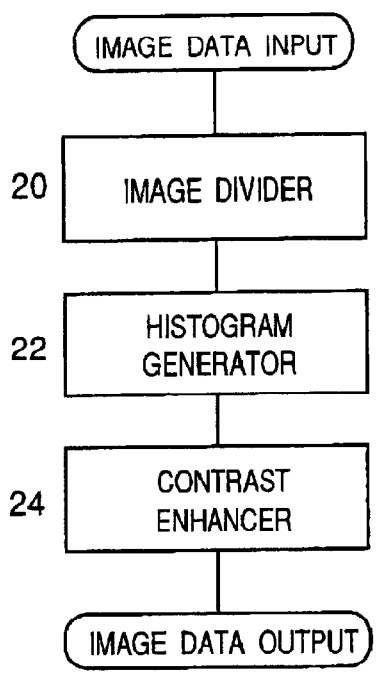
FIG. 3 is a block diagram of a contrast correction system.

As shown in FIG. 3, the contrast correction is performed by an image divider 20 which divides input image data into rectangles, a histogram generator 22 which generates a histogram for each rectangle, and a contrast enhancer 24 which enhances contrast for each rectangle to output the image data thereafter. The contrast correction is explained below as a software program, but at least a part thereof may be fabricated as a hardware circuit.

Figure 4:
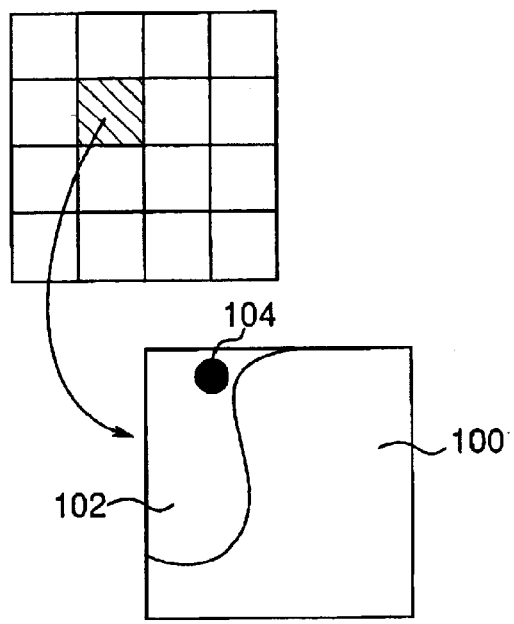
FIG. 4 is a diagram of division of image into rectangles and one of the rectangles enlarged for illustration.

FIG. 4 shows a situation schematically where an image is divided into rectangles, one of which being enlarged for illustration. The rectangle includes an area 100 (brighter area) and another area 102 (darker area). A point 104 represents a point in the area 102.

Figure 5:
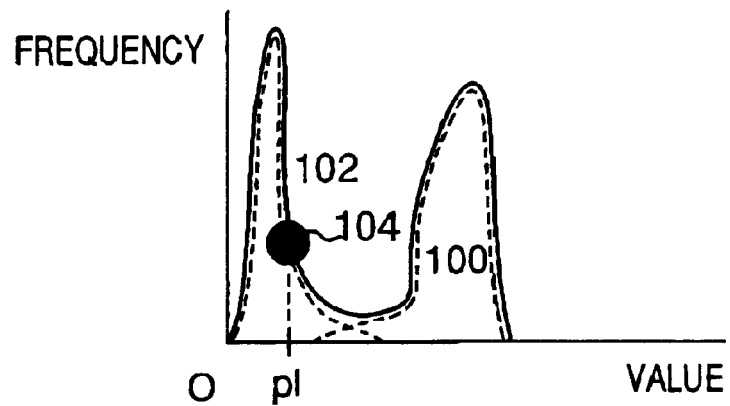
FIG. 5 is a value histogram of the rectangle shown in FIG. 4.

FIG. 5 is a histogram of the rectangle shown in FIG. 4. It is apparent that the histogram is a multimodal histogram having a plurality of peaks of frequency. Image data comprises components of value, chroma and hue, and the histogram explained below is a histogram of value. It is apparent that the value histogram has two peaks (bimodal histogram). The histogram is a sum of histograms for the sub-areas 100 and 102 shown in FIG. 5 with dashed lines. The value at a point 104 is p1.

Figure 6:
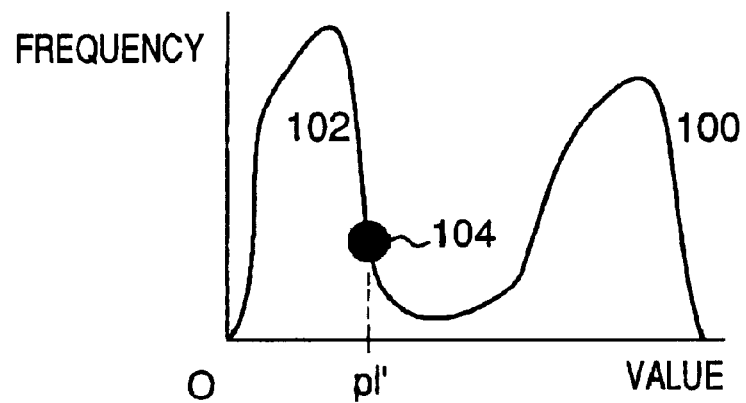
FIG. 6 is a prior art value histogram of rectangle after contrast enhancement.

For comparison, FIG. 6 is a value histogram of the rectangle shown in FIG. 4 after prior art contrast enhancement. In the contrast correction, the contrast correction factor is determined for each rectangle according to the pattern of the histogram. Next, value data is calculated with the contrast correction factors determined for the adjacent rectangles, and the value data is subjected to linear interpolation, and the value of point 104 after the conversion is p1'. However, based on the histogram for the area 102 (shown in FIG. 5), it is apparent that the area 102 should not be subjected to overemphasis. Because the area 102 is very dark and has small dispersion of value data (a generally uniform area), when contrast is overemphasized, noises are emphasized or the area does not become uniform. In this comparison example, the value p1' is rather high, and the area 102 is overemphasized on contrast.

Figure 7:
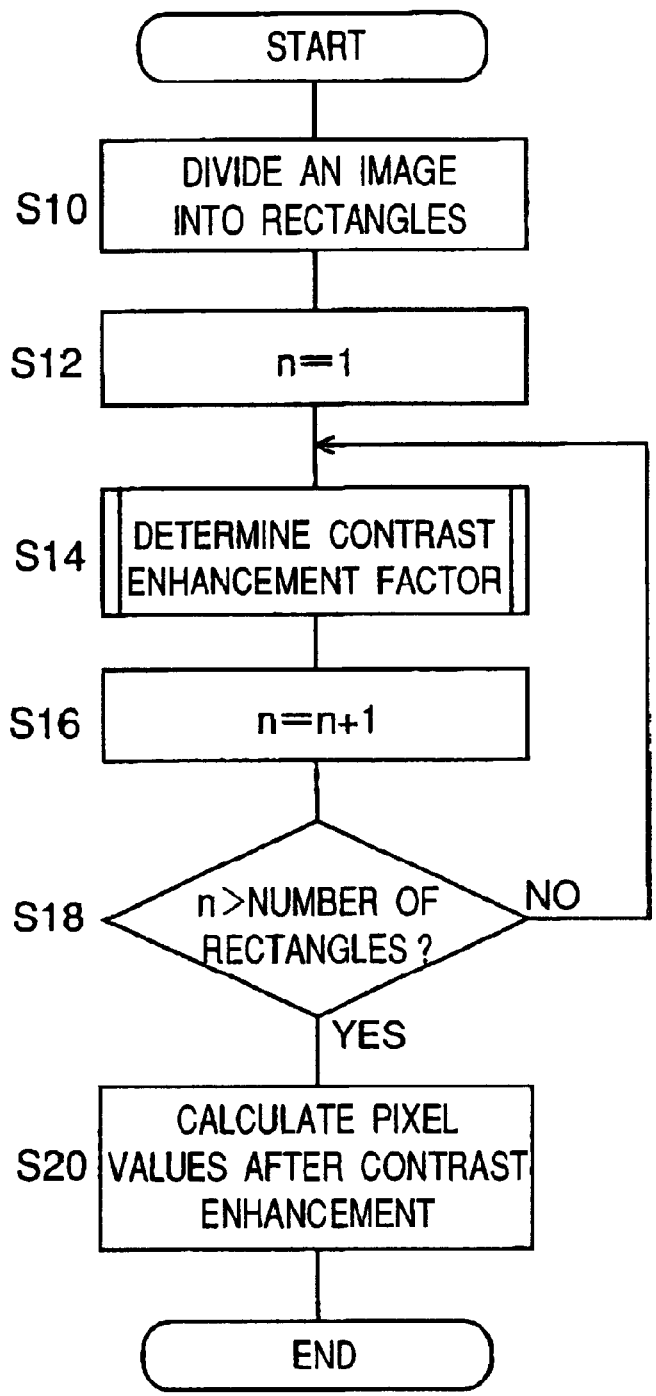
FIG. 7 is a main flowchart.

Next, contrast correction in the unit of rectangle according to a first embodiment of the invention is explained. FIG. 7 is a main flowchart of CPU 201 for the contrast correction. First, an image is divided into rectangles (S10). Then, a factor of contrast enhancement is determined for each of the rectangles. First, a variable "n" which represents a rectangle is set to one (S12), and the contrast enhancement factor is determined for the rectangle (S14, refer to FIG. 8). Then, "n" is incremented (S16), and if "n" is not larger than the total number of the rectangles (NO at step S18), the flow returns to step S14, and the above processing is repeated. Next, each pixel in the image is converted with the contrast enhancement factor for the rectangle including the pixel (S18). In order to keep continuity of image data between adjacent rectangles, value data is calculated with the contrast correction factors determined for the relevant adjacent rectangles, and the value data is subjected to linear interpolation for the conversion.

Figure 8:
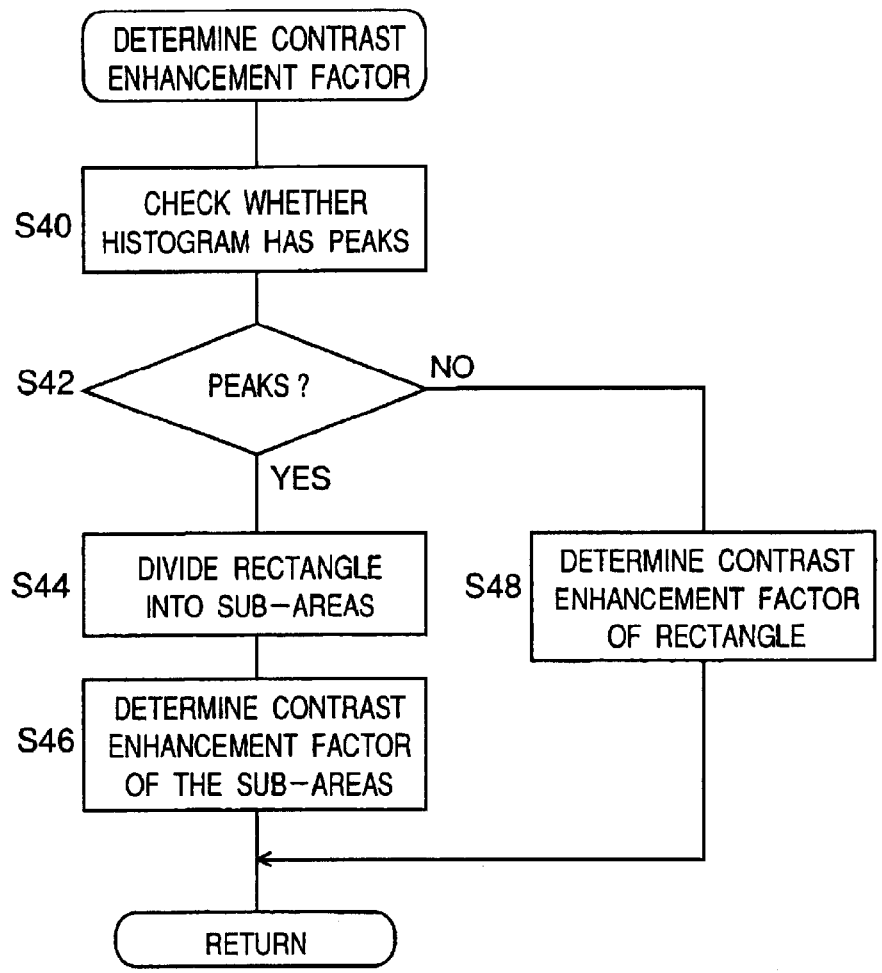
FIG. 8 is a flowchart of the processing of determining ratio of contrast enhancement in a first embodiment.

FIG. 8 is a flowchart of determining the contrast enhancement ratio (S14 in FIG. 7). First, it is checked whether the histogram is multimodal or it has peaks of frequency (S40). For example, a valley in the histogram pattern is detected for the check. In order to check a valley or valleys at high speed, the rectangle is divided into sub-areas, and an average is determined for each sub-area. Then, the averages are compared between them to determine whether the histogram has peaks. If the difference exceeds a certain level, it is determined that the histogram has peaks.

When it is determined that the histogram of the rectangle has peaks (YES at S42), the rectangle is divided into sub-areas by taking the pixel data into account. The division into sub-areas is processed with a known technique such as area expansion. In the area expansion technique, for each pixel in a rectangle, a characteristic quantity thereof is compared with that of an adjacent pixel, and if there is substantially no difference, the adjacent pixel is determined to belong to the same sub-area. In this way, the pixels are combined continuously. Next, the contrast enhancement factor is determined for each of the sub-areas (S46). The contrast enhancement factor is determined according to the histogram pattern. For example, if the dispersion of the value data is large to some extent, the contrast enhancement factor is determined to expand the histogram to the full dynamic range of the rectangle. On the other hand, if the dispersion of the value is rather small, the contrast enhancement factor is set to a smaller value than the case of large dispersion in order to prevent over-enhancement of contrast. On the contrary, when it is not determined that the histogram has peaks (NO at S42), the contrast enhancement factor is determined in the unit of rectangle according to the histogram (S48).

Figure 9:
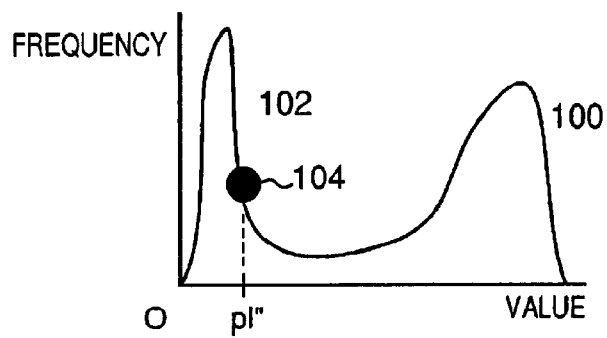
FIG. 9 is a diagram of value histogram after contrast enhancement.

FIG. 9 shows an example of value histogram obtained by the contrast enhancement for the original histogram shown in FIG. 5. The value data at point 104 becomes p1" after the conversion. As to sub-area 100 including higher value data, the histogram is expanded in the full dynamic range by increasing the contrast enhancement factor. On the other hand, as to sub-area 102 including lower value data, the contrast enhancement factor is suppressed at a smaller value than the counterpart for the sub-area 100, as will be understood by comparing FIG. 9 with FIG. 4. Then, the value data p1" at point 104 does not change much, and the sub-area 102 is not over-corrected on contrast.

Next, contract correction in the unit of rectangle according to a second embodiment of the invention is explained. The main flowchart is similar to the counterpart in the first embodiment shown in FIG. 7, and the explanation thereon is omitted here.

Figure 10:
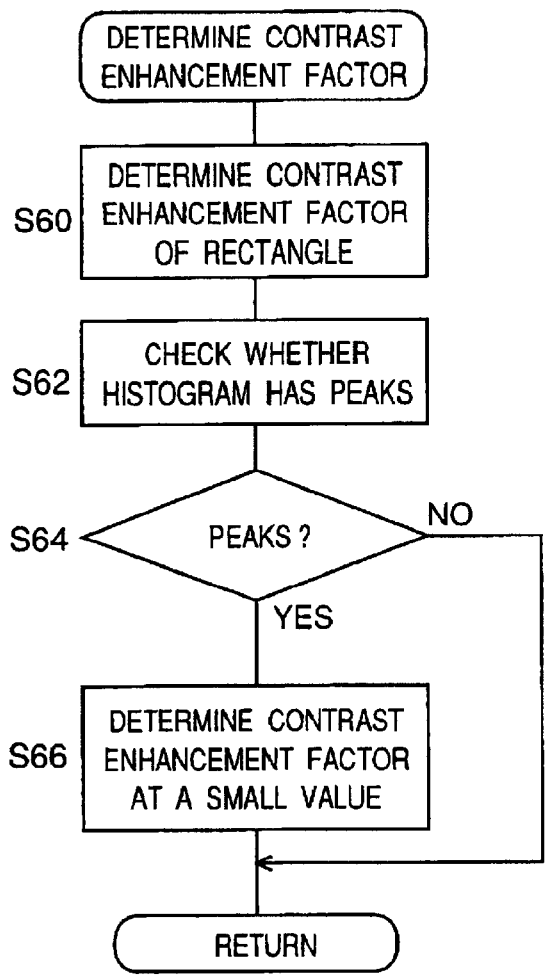
FIG. 10 is a flowchart of the processing of determining factor of contrast enhancement in a second embodiment.

FIG. 10 is a flowchart of the determination of contrast enhancement factor (FIG. 7, S14). First, the contrast enhancement factor is determined according to the histogram pattern (S60). Next, it is checked whether the histogram has peaks (S62). The check is performed similarly to that of the first embodiment. When the histogram is determined to have peaks (YES at S64), the contrast enhancement factor determined at step S60 is decreased (S66).

Figure 11:
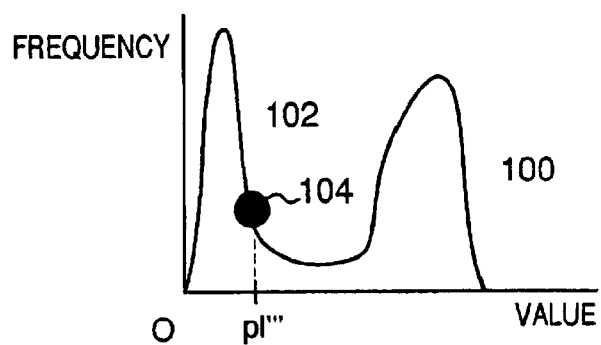
FIG. 11 is a diagram of value histogram after contrast enhancement.

FIG. 11 is a value histogram obtained by the contrast enhancement on the histogram shown in FIG. 4. The value data at point 104 becomes p'" after the conversion. Because the contrast enhancement factor is suppressed to a small factor, the emphasis of contrast is suppressed in the two sub-areas 100 and 102. The value data of p1"' is not changed much from the original value, and over-correction on contrast is prevented for the area 102. In contrast enhancement of this embodiment, the contrast enhancement factor is decreased without dividing the rectangle, in contrast to that of the first embodiment. Thus, an advantageous that contrast is not over-enhanced is realized at high speed in a simple way.

Figure 12:
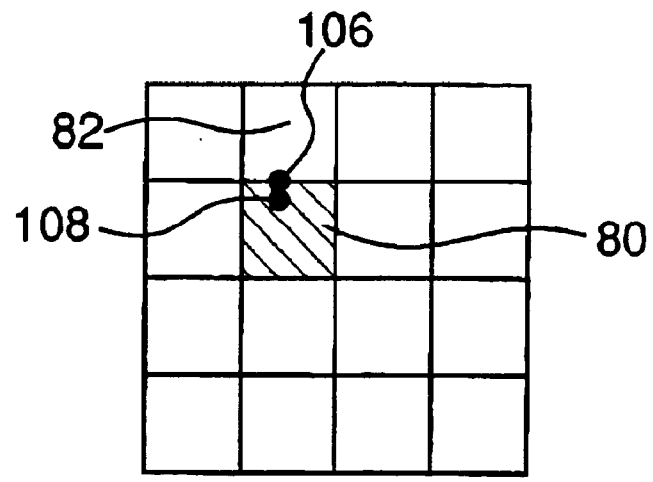
FIG. 12 is a diagram for explaining an example of contrast correction.
Figure 13:
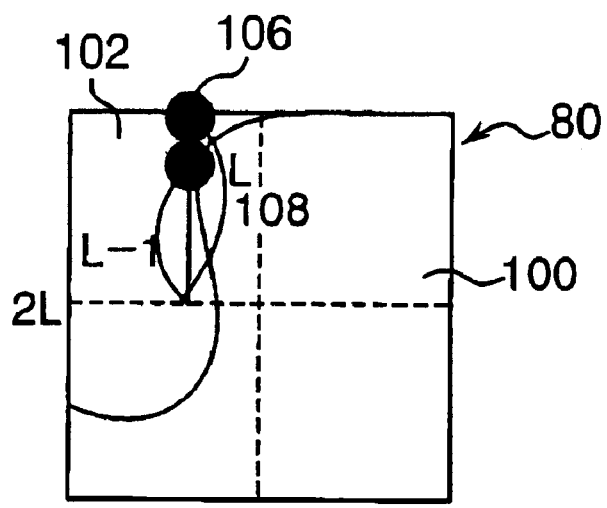
FIG. 13 is a diagram of an image of a rectangle for explaining an example of contrast correction.

The advantage of the invention that reversal of value data is prevented on contrast correction is explained further below. In the previous contrast correction, the reversal of value change is liable to happen, as pointed out above. When the contrast is corrected in the unit of rectangle, the contrast enhancement factor is determined for each rectangle, and the value data is corrected with linear interpolation by using the contrast enhancement factors of adjacent rectangles. The contrast enhancement factors are 2.0 and 1.0 for two adjacent rectangles 80 and 82 shown in FIG. 12. FIG. 13 shows the rectangle 80 shown in FIG. 12 with hatching. As to two points 106 and 108 in the rectangle 80, the adjacent rectangle thereof is the rectangle 82. The length of a side of the rectangles is 2L. Contrast at the two points 106 and 108 in the rectangle 80 is enhanced with linear extrapolation as follows. In order to simplify explanation, interpolation is performed only in the vertical direction. The points 106 and 108 are distant from the center of the rectangle 80 in the vertical direction by L and by L-1 respectively. The value data at points 106 and 108 are converted as follows by representing value data at the points 106 and 108 before conversion as v106 and v108 and after conversion as v106' and v108'.

$$p106' = (2.0 * L * v106 + 1.0 * L * v106)/2L$$
$$= 3L * v106/2L$$
$$p108' = \{2.0 * (L+1) * v108 + 1.0 * (L-1) * v108\}/2L$$
$$= (3L+1) * v108/2L.$$

Then, even when v106>v108, v108 may become larger is some cases.

If a rectangle includes two or more sub-areas having a large value difference, another rectangle adjacent to the rectangle is generally likely to be one of the areas. In such a case, the value is liable to be reversed in the prior art method as explained above because the contrast in an area is enhanced by considering the contrast enhancement factor of an adjacent area.

On the contrary, in the example shown in FIG. 13, because the histogram of the rectangle 80 has two peaks, the rectangle 80 is divided into two sub-areas 100 and 102, and the contrast enhancement factor is determined for each sub-area to enhance the contrast for each sub-area. Because the sub-areas 100 and 102 have the contrast enhancement factors of 2.0 and 1.0 in this example, the result of linear extrapolation is as follows.

$$v106' = (1.0 * L * v106 + 1.0 * L * v106)/2L$$
$$= v106.$$
$$v108' = \{1.0 * (L+1) * v108 + 1.0 * (L-1) * v108\}/2L$$
$$= v108.$$

Thus, the over-emphasis of contrast is prevented, and the reversal of value data does not happen.

In the second embodiment, in the conversion of points 106 and 108 in area 102, the contrast enhancement factor is set to have a small value by considering the existence of peaks in the histogram. Therefore, the reversal value change does not happen.

In the above-mentioned embodiments, contrast correction is performed by using the contrast enhancement factor for multiplying the pixel data therewith. However, the contrast correction is not limited thereto. For example, a conversion curve on the relationship between input and output data can be used for contrast correction. That is, in the first embodiment, a conversion curve is selected or generated for sub-areas in a rectangle. In the second embodiment, a conversion curve which does not enhance contrast excessively is selected or generated when the histogram has peaks.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processor comprising:
   a divider which divides an image into rectangles;
   a histogram generator which generates a histogram of value data of the image for each of the rectangles;
   a discriminator which discriminates whether the histogram generated by said histogram generator has a plurality of peaks; and
   a contrast enhancer which, when said discriminator discriminates that the histogram of a rectangle has a plurality of peaks, divides the rectangle into sub-areas and enhances contrast in the rectangle in the unit of sub-area.

2. The image processor according to claim 1, wherein said contrast enhancer enhances contrast by changing contrast enhancement factor to be multiplied with a pixel value, the contrast enhancement factor being determined for each rectangle according to histogram thereof.

3. The image processor according to claim 1, wherein said contrast enhancer enhances contrast by changing a conversion curve on the relationship between input and output data.

4. The image processor according to claim 1, wherein said discriminator detects a valley in the histogram in order to discriminate whether the histogram has a plurality of peaks.

5. The image processor according to claim 1, wherein said discriminator divides each of rectangles into a plurality of portions, obtains an average of value data in each of the portions and compares the averages in order to discriminate whether the histogram has a plurality of peaks.

6. The image processor according to claim 5, wherein said contrast enhancer divides each rectangle into sub-areas by comparing value data of each pixel in a sub-area with an adjacent pixel and by adding the adjacent pixel to the sub-area when difference of value data between the two pixels is smaller than a predetermined threshold.

7. A method for image processing comprising the steps of:
dividing an image into rectangles;
generating a histogram of value data of the image for each of the rectangles;
discriminating whether the histogram has a plurality of peaks; and
when the histogram of one of the rectangles is discriminated to have a plurality of peaks, dividing the one rectangle into sub-areas and enhancing contrast in the one rectangle in the unit of sub-area.

8. The method according to claim 7, wherein contrast is enhanced by changing contrast enhancement factor to be multiplied with a pixel value, the contrast enhancement factor being determined for each rectangle according to histogram thereof.

9. The method according to claim 7, wherein contrast is enhanced by changing a conversion curve on the relationship between input and output data.

10. The method according to claim 7, wherein a valley in the histogram is detected in order to discriminate whether the histogram has a plurality of peaks.

11. The method according to claim 7, wherein each of rectangles is divided into a plurality of portions, an average of value data is obtained in each of the portions and the averages are compared in order to discriminate whether the histogram has a plurality of peaks.

12. The method according to claim 11, wherein each rectangle is divided into sub-areas by comparing value data of each pixel in a sub-area with an adjacent pixel and by adding the adjacent pixel to the sub-area when difference of value data between the two pixels is smaller than a predetermined threshold.

13. A recording medium which stores a computer program comprising the steps of:
dividing an image into rectangles;
generating a histogram of value data of the image for each of the rectangles;
discriminating whether the histogram has a plurality of peaks; and
when the histogram of one of the rectangles is discriminated to have a plurality of peaks, dividing the rectangle into sub-areas and enhancing contrast in the one rectangle in the unit of sub-area.

14. The recording medium according to claim 13, wherein contrast is enhanced by changing contrast enhancement factor to be multiplied with a pixel value, the contrast enhancement factor being determined for each rectangle according to histogram thereof.

15. The recording medium according to claim 13, wherein contrast is enhanced by changing a conversion curve on the relationship between input and output data.

16. The recording medium according to claim 13, wherein a valley in the histogram is detected in order to discriminate whether the histogram has a plurality of peaks.

17. The recording medium according to claim 13, wherein each of rectangles is divided into a plurality of portions, an average of value data is obtained in each of the portions and the averages are compared in order to discriminate whether the histogram has a plurality of peaks.

18. The recording medium according to claim 17, wherein each rectangle is divided into sub-areas by comparing value data of each pixel in a sub-area with an adjacent pixel and by adding the adjacent pixel to the sub-area when difference of value data between the two pixels is smaller than a predetermined threshold.

19. An image processor comprising:
a divider which divides an image into rectangles;
a histogram generator which generates a histogram of value data of the image for each of the rectangles;
a discriminator which discriminates whether the histogram generated by said histogram generator has a plurality of peaks; and
a contrast enhancer which enhances contrast in the unit of rectangle according to the histogram, wherein when said discriminator discriminates that the histogram of a rectangle has a plurality of peaks, said contrast enhancer enhances the contrast on the rectangle to a degree smaller than the counterpart when said discriminator discriminates that the histogram of a rectangle does not have a plurality of peaks.

20. The image processor according to claim 19, wherein said contrast enhancer enhances contrast by changing contrast enhancement factor to be multiplied with a pixel value, the contrast enhancement factor being determined for each rectangle according to histogram thereof.

21. The image processor according to claim 19, wherein said contrast enhancer enhances contrast by changing a conversion curve on the relationship between input and output data.

22. The image processor according to claim 19, wherein said discriminator detects a valley in the histogram in order to discriminate whether the histogram generated has a plurality of peaks.

23. The image processor according to claim 19, wherein said discriminator divides each of rectangles into a plurality of portions, obtains an average of value data in each of the portions and compares the averages in order to discriminate whether the histogram has a plurality of peaks.

24. A method for image processing comprising the steps of:
dividing an image into rectangles;
generating a histogram of value data of the image for each of the rectangles;
discriminating whether the histogram has a plurality of peaks; and
enhancing contrast in the unit of rectangle according to the histogram, wherein when the histogram of a rectangle is discriminated to have a plurality of peaks, the contrast on the rectangle is enhanced to a degree smaller than the counterpart when the histogram of a rectangle is not discriminated to have a plurality of peaks.

25. The method according to claim 24, wherein contrast is enhanced by changing contrast enhancement factor to be multiplied with a pixel value, the contrast enhancement factor being determined for each rectangle according to histogram thereof.

26. The method according to claim 24, wherein contrast is enhanced by changing a conversion curve on the relationship between input and output data.

27. The method according to claim 24, wherein a valley in the histogram is detected in order to discriminate whether the histogram has a plurality of peaks.

28. The method according to claim 24, wherein each of rectangles is divided into a plurality of portions, an average of value data is obtained in each of the portions and the averages are compared in order to discriminate whether the histogram has a plurality of peaks.

29. A recording medium which stores a computer program comprising the steps of:

dividing an image into rectangles;

generating a histogram of value data of the image for each of the rectangles;

discriminating whether the histogram has a plurality of peaks; and enhancing contrast in the unit of rectangle according to the histogram, wherein when the histogram of a rectangle is discriminated to have a plurality of peaks, the contrast on the rectangle is enhanced to a degree smaller than the counterpart when the histogram of a rectangle is not discriminated to have a plurality of peaks.

30. The method according to claim 29, wherein contrast is enhanced by changing contrast enhancement factor to be multiplied with a pixel value, the contrast enhancement factor being determined for each rectangle according to histogram thereof.

31. The method according to claim 29, wherein contrast is enhanced by changing a conversion curve on the relationship between input and output data.

32. The recording medium according to claim 29, wherein a valley in the histogram is detected in order to discriminate whether the histogram has a plurality of peaks.

33. The recording medium according to claim 29, wherein each of rectangles is divided into a plurality of portions, an average of value data is obtained in each of the portions and the averages are compared in order to discriminate whether the histogram has a plurality of peaks.

* * * * *